United States Patent
Kalkofen et al.

(10) Patent No.: US 10,100,188 B2
(45) Date of Patent: Oct. 16, 2018

(54) COMPOSITIONS THAT CAN BE VULCANIZED AND THAT ARE BASED ON ETHYLENE/VINYL ACETATE COPOLYMERS CONTAINING EPOXY GROUPS

(75) Inventors: Rainer Kalkofen, Leverkusen (DE); Hans Magg, Kuerten (DE); Andreas Roos, Duesseldorf (DE); Sven Brandau, Strasbourg (FR)

(73) Assignee: ARLANXEO Deutschland GmbH, Dormagen (DE)

( * ) Notice: Subject to any disclaimer, the term of this patent is extended or adjusted under 35 U.S.C. 154(b) by 89 days.

(21) Appl. No.: 14/240,781

(22) PCT Filed: Aug. 31, 2012

(86) PCT No.: PCT/EP2012/066983
§ 371 (c)(1),
(2), (4) Date: Jan. 23, 2015

(87) PCT Pub. No.: WO2013/030352
PCT Pub. Date: Mar. 7, 2013

(65) Prior Publication Data
US 2015/0203675 A1    Jul. 23, 2015

(30) Foreign Application Priority Data
Sep. 2, 2011  (EP) .................................... 11179940

(51) Int. Cl.
*C08L 13/00* (2006.01)
*C08L 9/02* (2006.01)
*C08L 23/08* (2006.01)
*C08L 31/04* (2006.01)
*C08F 220/32* (2006.01)

(52) U.S. Cl.
CPC ............... *C08L 31/04* (2013.01); *C08L 9/02* (2013.01); *C08L 13/00* (2013.01); *C08L 23/0884* (2013.01); *C08F 220/32* (2013.01); *C08L 2201/02* (2013.01); *C08L 2312/00* (2013.01)

(58) Field of Classification Search
None
See application file for complete search history.

(56) References Cited

U.S. PATENT DOCUMENTS

| 3,700,637 A | 10/1972 | Finch |
| 4,381,378 A * | 4/1983 | Harrell, Jr. ......... C08G 59/5093 525/375 |
| 4,464,515 A | 8/1984 | Rempel et al. |
| 4,503,196 A | 3/1985 | Rempel et al. |
| 4,581,417 A | 4/1986 | Buding et al. |
| 4,631,315 A | 12/1986 | Boding et al. |
| 4,650,834 A * | 3/1987 | Yagishita ............... C08C 19/40 525/208 |
| 4,746,707 A | 5/1988 | Fiedler et al. |
| 4,795,788 A | 1/1989 | Himmler et al. |
| 4,816,525 A | 3/1989 | Rempel et al. |
| 4,826,721 A | 5/1989 | Obrecht et al. |
| RE34,548 E | 2/1994 | Fiedler et al. |
| 5,427,595 A * | 6/1995 | Pihl .................... A01D 34/4168 428/361 |
| 6,307,624 B1 | 10/2001 | Bruck et al. |
| 6,522,408 B1 | 2/2003 | Bruck et al. |
| 6,683,136 B2 | 1/2004 | Guo et al. |
| 6,933,342 B2 | 8/2005 | Parg et al. |
| 7,951,875 B2 | 5/2011 | Guerin et al. |
| 2009/0061134 A1* | 3/2009 | Ajbani .................... C08L 81/02 428/36.4 |
| 2010/0240848 A1* | 9/2010 | Guerin .................... C08C 19/02 526/171 |

FOREIGN PATENT DOCUMENTS

| DE | 2539132 A1 | 3/1977 | |
| EP | 0471250 A1 | 2/1992 | |
| JP | 3-292345 A * | 12/1991 | |
| JP | 3292345 A2 | 12/1991 | |
| WO | WO 2005/080492 A1 * | 9/2005 | ............. C08L 13/00 |
| WO | 2006047691 A2 | 5/2006 | |

OTHER PUBLICATIONS

Machine translation of JP H03-292345 A, provided by the EPO website (no date).*
Ullmann's Encyclopedia of Industrial Chemistry VCH Verlagsgesellschaff mbH, D-69451 Weinheim, 1993, vol. A23 Rubber, 4 "Chemicals and Additives", p. 366-417.
European Search Report from co-pending Application EP11179940 dated Apr. 23, 2012, 2 pages.

* cited by examiner

*Primary Examiner* — Michael J Feely

(57) ABSTRACT

The invention relates to vulcanizable compositions comprising
(a) at least one ethylene-vinyl acetate copolymer containing epoxy groups and having a vinyl acetate content of at least 20% by weight, preferably at least 30% by weight, more preferably at least 40% by weight, based on the ethylene-vinyl acetate copolymer containing epoxy groups, and
(b) at least one carboxylated nitrile rubber.

17 Claims, No Drawings

COMPOSITIONS THAT CAN BE VULCANIZED AND THAT ARE BASED ON ETHYLENE/VINYL ACETATE COPOLYMERS CONTAINING EPOXY GROUPS

The invention relates to vulcanizable compositions based on ethylene-vinyl acetate copolymers containing epoxy groups, to a process for preparation thereof, to a process for production of vulcanizates therefrom, to the vulcanizates thus obtained and to the use thereof.

Nitrile rubbers, often also abbreviated to "NBR", are understood to mean rubbers which are co- or terpolymers of at least one α,β-unsaturated nitrile, at least one conjugated diene and optionally one or more further copolymerizable monomers. Hydrogenated nitrile rubbers ("HNBR") are understood to mean corresponding co- or terpolymers in which all or some of the C═C double bonds of the copolymerized diene units have been hydrogenated.

For many years, both NBR and HNBR have occupied an established position in the specialty elastomers sector. They possess an excellent profile of properties in the form of excellent oil resistance, good heat stability, excellent resistance to ozone and chemicals, the latter being even more pronounced in the case of HNBR than in the case of NBR. NBR and HNBR also have very good mechanical and performance properties. For this reason, they are widely used in a wide variety of different fields of use, and are used, for example, for production of gaskets, hoses, belts and damping elements in the automotive sector, and also for stators, well seals and valve seals in the oil production sector, and also for numerous parts in the electrical industry, mechanical engineering and shipbuilding. A multitude of different types are commercially available, and these feature, according to the application sector, different monomers, molecular weights, polydispersities and mechanical and physical properties. As well as the standard types, there is increasing demand particularly for specialty types featuring contents of specific termonomers or particular functionalizations.

In practical use of (H)NBR rubbers, the vulcanization of the rubbers is also becoming increasingly important, i.e. particularly the crosslinker system and the vulcanization conditions. Thus, in addition to the conventional rubber crosslinking systems based on peroxides or sulphur, which have already been in existence for several decades, the last few years have seen developments of various new concepts for alternative crosslinking. Such crosslinking concepts also include polymers which, due to functional groups, are not amenable to all forms of crosslinking and crosslinking agents and therefore constitute a particular challenge.

EP-A 1 096 190 describes blends of nitrile-butadiene rubbers (NBR) with PVC for improving the ozone resistance of NBR. These blends are used as an outer layer of fuel-resistant hoses, where NBR ensures a high diffusion barrier against fuel and PVC a good ozone resistance. This is because the PVC shields the double bonds present in the NBR, which suppresses any attack of the ozone on the NBR. However, the blends thus produced have a poor low-temperature flexibility and/or poor heat resistance, and a relatively high compression set.

NBR and PVC are polymers which are compatible when the acrylonitrile content of NBR is >25% by weight. This also gives rise to the good ozone resistance. Since, however, only few polymers are entirely compatible with one another, a drop in the ozone resistance is to be expected when NBR is extended with a halogen-free material having an otherwise similar profile of physical properties. Important properties of NBR/PVC blends are described in Gummi, Fasern, Kunststoffe (1997) 50(2), 126.

DE-A 10213227 describes compositions comprising an ethylene-vinyl acetate copolymer containing more than 40% by weight of vinyl acetate. These compositions are used for bonding of labels and films.

Furthermore, EP 0 374 666 B1 discloses a process for preparing ethylene/vinyl ester terpolymers. This describes ethylene-vinyl acetate-glycidyl methacrylate copolymer which is obtained by a solution polymerization process conducted continuously in a cascade with defined parameters (solvent content, pressure, temperature control, conversion).

It was an object of the present invention to provide a vulcanizable composition having both good ozone resistance and improved low-temperature properties and heat resistance.

The object is achieved by a vulcanizable composition comprising
(a) at least one ethylene-vinyl acetate copolymer containing epoxy groups and having a vinyl acetate content of at least 20% by weight, preferably at least 30% by weight, more preferably at least 40% by weight, based on the ethylene-vinyl acetate copolymer containing epoxy groups, and
(b) at least one carboxylated nitrile rubber.

Surprisingly, in the case of the inventive use of the aforementioned ethylene-vinyl acetate copolymer (a) containing epoxy groups together with a carboxylated nitrile rubber (b), thermally stable networks can be formed.

It has been found that the matrix of such compositions is homogeneous, and vulcanizates produced therefrom have ozone resistance and improved low-temperature and heat resistance.

Ethylene-Vinyl Acetate Copolymer (a) Containing Epoxy Groups

As is well known, ethylene, vinyl acetate and monomers containing epoxy groups can be free-radically polymerized in different ratios with random distribution of the copolymerized monomer units. The copolymerization can in principle be conducted by the following three processes:
1. emulsion polymerization,
2. solution polymerization and
3. high-pressure bulk polymerization.

The process for preparing the inventive epoxy-containing ethylene-vinyl acetate copolymer is effected by the polymerization processes customary in industry; particular preference is given to the solution process with the aid of free-radical initiators. Free-radical initiators are understood to mean peroxides and azo compounds. Particular preference is given to azo compounds such as ADVN (azodivaleronitrile). The process for preparing the inventive epoxy-containing ethylene-vinyl acetate copolymer is performed at temperatures in the range from 30 to 100° C., preferably at 40 to 80° C., and a pressure in the range from 5 to 500 bar, preferably 200 to 450 bar.

The monomers which contain epoxy groups and are used to prepare the ethylene-vinyl acetate copolymers containing epoxy groups have the general formula (I)

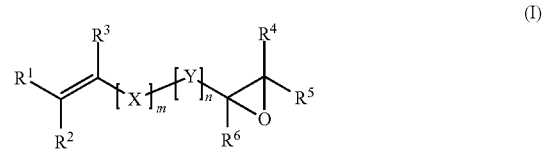

(I)

in which
m is 0 or 1 and
X is O, O(CR$_2$)$_p$, (CR$_2$)$_p$O, C(═O)O, C(═O)O(CR$_2$)$_p$, C(═O)NR, (CR$_2$)$_p$, N(R), N(R)(CR$_2$)$_p$, P(R), P(R)(CR$_2$)$_p$, P(═O)(R), P(═O)(R)(CR$_2$)$_p$, S, S(CR$_2$), S(═O), S(═O)(CR$_2$)$_p$, S(═O)$_2$(CR$_2$)$_p$ or S(═O)$_2$, where R in these radicals may have the same definitions as R$^1$-R$^6$, Y represents repeat units of one or more mono- or polyunsaturated monomers, comprising conjugated or nonconjugated dienes, alkynes and vinyl compounds, or a structural element which derives from polymers comprising polyethers, especially polyalkylene glycol ethers and polyalkylene oxides, polysiloxanes, polyols, polycarbonates, polyurethanes, polyisocyanates, polysaccharides, polyesters and polyamides, n and p are the same or different and are each in the range from 0 to 10 000, R, R$^1$, R$^2$, R$^3$, R$^4$, R$^5$ and R$^6$ are the same or different and are each H, a linear or branched, saturated or mono- or polyunsaturated alkyl radical, a saturated or mono- or polyunsaturated carbo- or heterocyclyl radical, aryl, heteroaryl, arylalkyl, heteroarylalkyl, alkoxy, aryloxy, heteroaryloxy, amino, amido, carbamoyl, alkylthio, arylthio, sulphanyl, thiocarboxyl, sulphinyl, sulphono, sulphino, sulpheno, sulphonic acids, sulphamoyl, hydroxyimino, alkoxycarbonyl, F, Cl, Br, I, hydroxyl, phosphonato, phosphinato, silyl, silyloxy, nitrile, borates, selenates, carbonyl, carboxyl, oxycarbonyl, oxysulphonyl, oxo, thioxo, epoxy, cyanates, thiocyanates, isocyanates, thioisocyanates or isocyanides.

Optionally, the definitions given for the R, R$^1$ to R$^6$ radicals and the repeat units Y of the general formula (I) are each mono- or polysubstituted.

The following radicals from the definitions for R, R$^1$ to R$^6$ preferably have such mono- or polysubstitution: alkyl, carbocyclyl, heterocyclyl, aryl, heteroaryl, arylalkyl, heteroarylalkyl, alkoxy, aryloxy, alkylthio, arylthio, amino, amido, carbamoyl, F, Cl, Br, I, hydroxyl, phosphonato, phosphinato, sulphanyl, thiocarboxyl, sulphinyl, sulphono, sulphino, sulpheno, sulphamoyl, silyl, silyloxy, carbonyl, carboxyl, oxycarbonyl, oxysulphonyl, oxo, thioxo, borates, selenates and epoxy. Useful substituents include provided that chemically stable compounds are the result—all definitions that R can assume. Particularly suitable substituents are alkyl, carbocyclyl, aryl, halogen, preferably fluorine, chlorine, bromine or iodine, nitrile (CN) and carboxyl.

Particular preference is given to using a monomer which contains epoxy groups and is of the general formula (I) in which X, R, R$^1$ to R$^6$ and mare each as defined above for the general formula (I), p and n are the same or different and are each in the range from 0 to 100.

Especially preferably, X, R, R$^1$ to R$^6$ and m are each as defined above for the general formula (I) and p is in the range from 0 to 100 and n is zero. This monomer containing epoxy groups thus has the general structure (Ia)

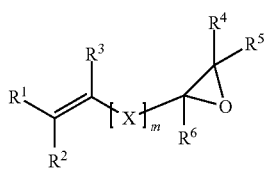

(Ia)

in which
X, R, R$^1$ to R$^6$, m and p are each as defined above for the general formula (I).

Especially preferably, a monomer is used which contains epoxy groups and is of the general formula (I), in which X, R and R$^1$ to R$^6$ are each as defined above for the general formula (I), m is 1, p is 1 and n is zero.

Preferred examples of monomers containing epoxy groups are 2-ethylglycidyl acrylate, 2-ethylglycidyl methacrylate, 2-(n-propyl)glycidyl acrylate, 2-(n-propyl)glycidyl methacrylate, 2-(n-butyl)glycidyl acrylate, 2-(n-butyl)glycidyl methacrylate, glycidyl methacrylate, glycidylmethyl acrylate, glycidylmethyl methacrylate, glycidyl acrylate, (3',4'-epoxyheptyl)-2-ethyl acrylate, (3',4'-epoxyheptyl)-2-ethyl methacrylate, 6',7'-epoxyheptyl acrylate, 6',7'-epoxyheptyl methacrylate, allyl glycidyl ether, allyl 3,4-epoxyheptyl ether, 6,7-epoxyheptyl allyl ether, vinyl glycidyl ether, vinyl 3,4-epoxyheptyl ether, 3,4-epoxyheptyl vinyl ether, 6,7-epoxyheptyl vinyl ether, o-vinylbenzyl glycidyl ether, m-vinylbenzyl glycidyl ether, p-vinylhenzyl glycidyl ether and 3-vinylcyclohexene oxide.

The monomer containing epoxy groups used is preferably a glycidyl(alkyl) acrylate. Particular preference is given to using glycidyl acrylate or glycidyl methacrylate.

The inventive ethylene-vinyl acetate copolymer containing epoxy groups is prepared using
i) 1 to 59% by weight of copolymerized ethylene,
ii) 40 to 99% by weight of copolymerized vinyl acetate and
iii) 1 to 20% by weight of copolymerized monomer which contains epoxy groups and is of the formula (I) or (Ia),
where the percentages are each based on the sum total of components (i+ii+iii), in solution, characterized in that the reaction is performed
in a polar organic solvent at a solvent concentration, based on the sum total of (monomers+solvents), of more than 20 to 75% by weight,
under pressures of 100 to 1000 bar,
at temperatures of 30 to 150° C., preferably 50 to 110° C.,
in the presence of 0.01 to 1.5% by weight, based on monomers used, of polymerization initiator,
up to a conversion, based on vinyl acetate ii), of 20 to 90% by weight, preferably 30 to 80% by weight, with metered addition of iii) in a solution of ii) and the solvent during the polymerization.

Preferably, iii) is used as a 5-60% by weight, preferably 10 to 50% by weight, solution of monomer containing epoxy groups, based on the vinyl acetate and the solvent, for the metered addition.

The metered addition is preferably continuous.

The proportions of the monomers must in each case add up to 100% by weight.

Polar organic solvents are solvents consisting to an extent of at least 50% by weight of tert-butanol. The preferred solvent is tert-butanol itself.

It is likewise conceivable to meter in all or individual components of the initiator system at the start of the polymerization and/or during the polymerization. Addition of all and individual components in portions during the polymerization is preferred. Sequential addition can be used to control the reaction rate. To achieve homogeneous running of the polymerization, it is possible to use only a portion of the initiator system for the start of the polymerization and to meter in the rest during the polymerization.

Alternatively, it is also possible to use the ethylene-vinyl acetate copolymer containing epoxy groups prepared by the process from EP 0 374 666 B1.

Preferably, the proportion of epoxy monomers is less than 20% by weight, preferably less than 15% by weight, more preferably less than 10% by weight, based on the ethylene-vinyl acetate copolymer.

Carboxylated Nitrile Rubber (b)

Carboxylated nitrile rubbers used in the inventive vulcanizable compositions may be any suitable carboxylated nitrile rubbers having repeat units derived from at least one conjugated diene, at least one α,β-unsaturated nitrile and one or more further copolymerizable monomers containing carboxyl groups.

Any conjugated diene may be present in the carboxylated nitrile rubber. Preference is given to using ($C_4$-$C_6$) conjugated dienes. Particular preference is given to 1,2-butadiene, 1,3-butadiene, isoprene, 2,3-dimethylbutadiene, piperylene or mixtures thereof. Especially preferred are 1,3-butadiene and isoprene or mixtures thereof. Even more preferred is 1,3-butadiene.

The α,β-unsaturated nitrile used may be any known α,β-unsaturated nitrile, preference being given to ($C_3$-$C_5$)-α,β-unsaturated nitriles such as acrylonitrile, methacrylonitrile, ethacrylonitrile or mixtures thereof. Particular preference is given to acrylonitrile.

Further copolymerizable monomers used if desired may, for example, be aromatic vinyl monomers, preferably styrene, α-methylstyrene and vinylpyridine, fluorinated vinyl monomers, preferably fluoroethyl vinyl ether, fluoropropyl vinyl ether, o-fluoromethylstyrene, vinyl pentafluorobenzoate, difluoroethylene and tetrafluoroethylene, or else copolymerizable antiageing monomers, preferably N-(4-anilinophenyl)acrylamide, N-(4-anilinophenyl)methacrylamide, N-(4-anilinophenyl)cinnamide, N-(4-anilinophenyl)crotonamide. N-phenyl-4-(3-vinylbenzyloxy)aniline and N-phenyl-4-(4-vinylbenzyloxy)aniline, and also nonconjugated dienes, such as 4-cyanocyclohexene and 4-vinylcyclohexene, or else alkynes such as 1- or 2-butyne.

Alternatively, further copolymerizable monomers used may be copolymerizable termonomers containing carboxyl groups, for example α,β-unsaturated monocarboxylic acids, esters thereof, α,β-unsaturated dicarboxylic acids, mono- or diesters thereof or the corresponding anhydrides or amides thereof.

The repeat units of a monomer containing carboxyl groups used in the carboxylated nitrile rubber have the general formula (II)

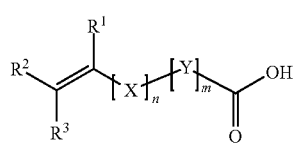

(II)

in which $R^1$, $R^2$, $R^3$ are the same or different and are each H, a linear or branched, saturated or mono- or polyunsaturated alkyl radical, a saturated or mono- or polyunsaturated carbo- or heterocyclyl radical, aryl, heteroaryl, arylalkyl, heteroarylalkyl, alkoxy, aryloxy, heteroaryloxy, amino, amide, carbamoyl, alkylthio, arylthio, sulphanyl, thiocarboxyl, sulphinyl, sulphono, sulphino, sulpheno, sulphonic acids, sulphamoyl, hydroxyimino, alkoxycarbonyl, F, Cl, Br, I, hydroxyl, phosphonato, phosphinato, silyl, silyloxy, nitrile, borates, selenates, carbonyl, carboxyl, oxycarbonyl, oxysulphonyl, oxo, thioxo, epoxy, cyanates, thiocyanates, isocyanates, thioisocyanates, isocyanides or carboxyl groups, n is 0 or 1 and X is O, $O(CR_2)_p$, $(CR_2)_pO$, $C(=O)O$, $C(=O)O(CR_2)_p$, $C(=O)NR$, $(CR_2)_p$, $N(R)$, $N(R)(CR_2)_p$, $P(R)$, $P(R)(CR_2)_p$, $P(=O)(R)$, $P(=O)(R)(CR_2)$, S, $S(CR_2)$, $S(=O)$, $S(=O)(CR_2)_p$, $S(=O)_2(CR_2)_p$ or $S(=O)_2$, where R in these radicals may have the same definitions as R1-R3 and p may assume values between 1 and 1000, m is 0 or 1 and Y are the same or different and are each a linear or branched, saturated, mono- or polyunsaturated alkyl radical, a saturated, mono- or polyunsaturated carbo- or heterocyclyl radical, aryl, heteroaryl, arylalkyl, heteroarylalkyl or alkoxyaryl radical.

The amount of carboxylic acid monomer polymerized within the nitrile rubber is generally 1 to 20 parts by weight and preferably 2 to 10 parts by weight, based on 100 parts by weight of the nitrile rubber which derives from acrylonitrile and the conjugated diene monomers.

Metathesis and Hydrogenation:

It is also possible that the preparation of the carboxylated nitrile rubber (1) is followed by a metathesis reaction to reduce the molecular weight of the nitrite rubber or (2) a metathesis reaction and a subsequent hydrogenation or (3) only a hydrogenation. These metathesis or hydrogenation reactions are sufficiently well-known to those skilled in the art and are described in the literature. Metathesis is known, for example, from WO-A-02/100941 and WO-A-02/100905 and can be used to reduce the molecular weight.

The hydrogenation can be performed using homogeneous or heterogeneous hydrogenation catalysts. The catalysts used are based typically on rhodium, ruthenium or titanium, but it is also possible to use platinum, iridium, palladium, rhenium, ruthenium, osmium, cobalt or copper, either as the metal or else preferably in the form of metal compounds (see, for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. No. 4,464,515 and U.S. Pat. No. 4,503,196).

Suitable catalysts and solvents for a hydrogenation in homogeneous phase are described hereinafter and are also known from DE-A-25 39 132 and EP-A-0 471 250. The selective hydrogenation can be achieved, for example, in the presence of a rhodium or ruthenium catalyst. It is possible to use, for example, a catalyst of the general formula $(R^1_mB)_lMX_n$.

in which M is ruthenium or rhodium, $R^1$ is the same or different and is a $C_1$-$C_8$ alkyl group, a $C_4$-$C_8$ cycloalkyl group, a $C_6$-$C_{15}$ aryl group or a $C_7$-$C_{15}$ aralkyl group. B is phosphorus, arsenic, sulphur or a sulphoxide group S=O, X is hydrogen or an anion, preferably halogen and more preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)rhodium(III) chloride and tris(dimethyl sulphoxide)rhodium(III) chloride, and also tetrakis(triphenylphosphine)rhodium hydride of the formula $(C_6H_5)_3P)_4RhH$ and the corresponding compounds in which the triphenylphosphine has been replaced fully or partly by tricyclohexylphosphine. The catalyst can be used in small amounts. An amount in the range of 0.01-1% by weight, preferably in the range of 0.03-0.5% by weight and more preferably in the range of 0.1-0.3% by weight, based on the weight of the polymer, is suitable.

It is typically advisable to use the catalyst together with a cocatalyst which is a ligand of the formula $R^1_mB$ where $R^1$, m and B are each as defined above for the catalyst. Preferably, in is 3, B is phosphorus and the $R^1$ radicals may be the same or different. The cocatalysts preferably have trialkyl, tricycloalkyl, triaryl, triaralkyl, diaryl monoalkyl, diaryl monocycloalkyl, dialkyl monoaryl, dialkyl monocycloalkyl, dicycloalkyl monoaryl or dicycloalkyl monoaryl radicals.

Examples of cocatalysts can be found, for example, in U.S. Pat. No. 4,631,315. A preferred cocatalyst is triphenylphosphine. The cocatalyst is used preferably in amounts within a range of 0.3-5% by weight, preferably in the range of 0.5-4% by weight, based on the weight of the nitrile rubber to be hydrogenated. Preferably, in addition, the weight ratio of the rhodium catalyst to the cocatalyst is in the range from 1:3 to 1:55, more preferably in the range from 1:5 to 1:45, based on 100 parts by weight of the nitrile rubber to be hydrogenated; preferably 0.1 to 33 parts by weight of the cocatalyst, more preferably 0.5 to 20 and even more preferably 1 to 5 parts by weight, especially more than 2 but less than 5 parts by weight, of cocatalyst based on 100 parts by weight of the nitrile rubber to be hydrogenated, are used.

The practical conduct of the hydrogenation is known to those skilled in the art from U.S. Pat. No. 6,683,136. It is effected typically by contacting the nitrile rubber to be hydrogenated with hydrogen in a solvent such as toluene or monochlorobenzene at a temperature in the range from 100 to 150° C. and a pressure in the range from 50 to 150 bar for 2 to 10 h.

Hydrogenation is understood in the context of this invention to mean a conversion of the double bonds present in the starting nitrile rubber to an extent of at least 50%, preferably 70-100%, more preferably 80-100%. The determination of the degree of hydrogenation is well known to those skilled in the art and can be effected, for example, by Raman or IR spectroscopy (see, for example, EPA-0 897 933 for the determination by Raman spectroscopy or U.S. Pat. No. 6,522,408 for the determination via IR spectroscopy).

In the case of use of heterogeneous catalysts, these are typically supported catalysts based on palladium, which are supported, for example, on charcoal, silica, calcium carbonate or barium sulphate.

The inventive ethylene-vinyl acetate copolymers containing epoxy groups typically have Mooney viscosities (ML (1+4 @100° C.)) in the range from 5 to 120, preferably from 10 to 100 Mooney units, more preferably from 15 to 80 Mooney units. The values of the Mooney viscosity (ML 1+4 @0.100° C.) are determined by means of a shearing disc viscometer to DIN 53523/3 or ASTM D 1646 at 100° C.

The ethylene-vinylacetate copolymers containing epoxy groups typically additionally have a polydispersity $PDI=M_w/M_n$, where $M_w$ is the weight-average and $M_n$ the number-average molecular weight, in the range from 1.0 to 6.0 and preferably in the range from 1.5 to 5.0.

The glass transition temperatures of the ethylene-vinyl acetate copolymers containing epoxy groups are in the range from −80° C. to +20° C., preferably in the range from −70° C. to +15° C. and more preferably in the range from −40° C. to 10° C.

Preferably, the inventive vulcanizable composition has a ratio of (a):(b) of 1:3 to 3:1, preferably 1:1.

In a preferred embodiment, the inventive vulcanizable composition comprises
(a) at least one ethylene-vinyl acetate copolymer containing epoxy groups and having a vinyl acetate content of at least 20% by weight, preferably at least 30% by weight, more preferably at least 40% by weight, based on the ethylene-vinyl acetate copolymer containing epoxy groups, having repeat units derived from at least one ethylene, a vinyl ester, at least one monomer which contains epoxy groups and is selected from the group of 2-ethylglycidyl acrylate, 2-ethylglycidyl methacrylate, 2-(n-propyl)glycidyl acrylate, 2-(n-propyl)glycidyl methacrylate, 2-(n-butyl)glycidyl acrylate, 2-(n-butyl)glycidyl methacrylate, glycidyl methacrylate, glycidylmethyl acrylate, glycidylmethyl methacrylate, glycidyl acrylate, (3',4'-epoxyheptyl)-2-ethyl acrylate, (3',4'-epoxyheptyl)-2-ethyl methacrylate, 6',7'-epoxyheptyl acrylate, 6',7'-epoxyheptyl methacrylate, allyl glycidyl ether, allyl 3,4-epoxyheptyl ether, 6,7-epoxyheptyl allyl ether, vinyl glycidyl ether, vinyl 3,4-epoxyheptyl ether, 3,4-epoxyheptyl vinyl ether, 6,7-epoxyheptyl vinyl ether, o-vinylbenzyl glycidyl ether, m-vinylbenzyl glycidyl ether, p-vinylbenzyl glycidyl ether and 3-vinylcyclohexene oxide, and
(b) at least one carboxylated nitrile rubber.

A preferred embodiment of the invention concerns vulcanizable compositions which additionally comprise (c) at least one filler. It is possible to use, for example, carbon black, silica, carbon nanotubes, Teflon (the latter preferably in powder form) or silicates.

In further embodiments, the inventive vulcanizable compositions may also comprise one or more additives familiar to the person skilled in the art of rubber. These additives include filler activators, ageing stabilizers, reversion stabilizers, light stabilizers, ozone stabilizers, processing aids, plasticizers, mineral oils, tackifiers, blowing agents, dyes, pigments, waxes, resins, extenders, vulcanization retardants, and further or other additives known in the rubber industry (Ullmann's Encyclopedia of Industrial Chemistry, VCH Verlagsgesellschaft mbH, D-69451 Weinheim, 1993, vol A 23 "Chemicals and Additives", p. 366-417).

Useful filler activators include, for example, organic silanes, preferably vinyltrimethyloxysilane, vinyldimethoxymethylsilane, vinyltriethoxysilane, vinyltris(2-methoxyethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxysilane or (octadecypmethylditnethoxysilane. Further filler activators are, for example, interface-active substances such as triethanolamine, trimethylolpropane, hexanetriol, and polyethylene glycols with molecular weights of 74 to 10 000 g/mol. The amount of filler activators is typically 0 to 10 parts by weight, based on 100 parts by weight of ethylene-vinyl acetate copolymer containing epoxy groups.

Ageing stabilizers which may be added to the vulcanizable compositions may be any of those known to those skilled in the art, which are used typically in amounts of 0 to 5 parts by weight, preferably 0.5 to 3 parts by weight, based on 100 parts by weight of the ethylene-vinyl acetate copolymer containing epoxide groups.

Useful mould release agents include, for example, saturated or partly unsaturated fatty acids and oleic acids and derivatives thereof (fatty acid esters, fatty acid salts, fatty alcohols, fatty acid amides). In addition, it is possible to use products applicable to the mould surface, for example products based on low molecular weight silicone compounds, products based on fluoropolymers and products based on phenol resins. The mould release agents are used in amounts of 0 to 10 parts by weight, preferably 0.5 to 5 parts by weight, based on 100 parts by weight of the ethylene-vinyl acetate copolymer containing epoxide groups.

Another possibility is reinforcement with strengthening agents (fibres) made of glass, according to the teaching of U.S. Pat. No. 4,826,721, and another is reinforcement by cords, woven fabrics, fibres made of aliphatic and aromatic polyamides (Nylon®, Aramid®), polyesters and natural fibre products.

The invention further provides the process for producing the vulcanizable compositions by mixing at least one ethylene-vinyl acetate copolymer (a) containing epoxy groups with at least one carboxylated nitrile rubber (b).

This mixing operation can be effected in all mixing apparatuses familiar to those skilled in the art. When one or more fillers and one or more further rubber additives are used, they can also be mixed in any desired sequence.

The invention further provides a process for producing vulcanizates based on ethylene-vinyl acetate copolymers containing epoxy groups, wherein the inventive vulcanizable composition is crosslinked with increasing temperature in the range from 20 to 250° C., preferably in the range from 50 to 230° C., more preferably 100° C. to 210° C. The duration of the crosslinking reaction is in the range from one (1) minute to several days, preferably 5 minutes to 120 minutes. The vulcanization time is guided by the desired vulcanization product.

The invention also provides the vulcanizates thus obtainable. These exhibit very good values in the compression set test at room temperature, 100° C. and 150° C., and additionally high tensile stress up to 400% coupled with good breaking strains up to 25 MPa.

EXAMPLES

The nitrogen content for determination of the acrylonitrile content ("ACN content") in the inventive optionally fully or partly hydrogenated nitrile rubbers containing epoxy groups is determined to DIN 53 625 according to Kjeldahl. Due to the content of polar comonomers, the optionally hydrogenated nitrile rubbers containing epoxy groups are typically >85% by weight soluble in methyl ethyl ketone at 20° C.

The glass transition temperature and what are called the onset and offset points thereof are determined by means of Differential Scanning calorimetry (DSC) to ASTM E 1356-03 or to DIN 11357-2.

The termonomer content of the individual polymers was determined by means of 1H NMR (instrument: Bruker DPX400 with XWIN-NMR 3.1 software, measurement frequency 400 MHz).

The values of the Mooney viscosity (ML 1+4@100° C.) are determined in each case by means of a shearing disc viscometer to DIN 53523/3 or ASTM D 1646 at 100° C.

The vulcanization profile in the MDR and the analytical data thereof were measured on a Monsanto MDR 2000 rheometer to ASTM D5289-95.

The compression set ("CS") at the temperature specified was measured to DIN 53517.

The Shore A hardness was measured to ASTM-D2240-81.

The tensile tests to determine stress as a function of deformation were conducted to DIN 53504 or ASTM D412-80.

The abbreviations given in the tables below have the following meanings:
"RT" room temperature (23±2° C.)
"TS" tensile strength, measured at RT
"EB" elongation at break, measured at RT
"M50" modulus at 50% elongation, measured at RT
"M100" modulus at 100% elongation, measured at RT
"M300" modulus at 300% elongation, measured at RT
"S max" is the maximum torque of the crosslinking isotherm
"$t_{10}$" is the time when 10% of S max is attained
"$t_{95}$" is the time when 95% of S max is attained The Following Substances were Used in the Examples:

The following chemicals were purchased as commercial products from the companies specified in each case, or originate from production plants of the companies specified.

Corax® N550/30 carbon black (commercial product from Evonik Degussa)

ethylene commercial product from Air Liquide Deutschland GmbH vinyl acetate commercial product from Sigma-Aldrich Chemie GmbH glycidyl methacrylate commercial product from Sigma-Aldrich Chemie GmbH Krynac X 750 Grade carboxylated nitrile rubber with 7% carboxyl groups, 27% ACN, 47 MU (commercial product from LANXESS Emulsion Rubber, La Wantzenau, France)

tert-butanol commercial product from Sigma-Aldrich Chemie GmbH 2,2'-azobis(2,4-dimethylvaleronitrile (ADVN) commercial product from DuPont de Nemours I Preparation of the Inventive Epoxy-Containing Ethylene-Vinyl Acetate Copolymer The epoxy-containing ethylene-vinyl acetate copolymer was prepared in a 5 l stirred autoclave. For this purpose, 2030 g of a solution consisting of 709.0 g of t-butanol, 1317.0 g of vinyl acetate, 4.0 g of glycidyl methacrylate and 252.5 g of an activator solution consisting of 2.50 g of ADVN and 250.0 g of vinyl acetate/t-butanol solution (20% vinyl acetate) were drawn successively into the 5 l reactor at RT. The reactor was charged with nitrogen and then 1083 g of ethylene were injected. The temperature was increased to 61° C., in the course of which a pressure of about 380 bar was established. After half an hour, a solution consisting of 122.2 g oft-butanol, 107.8 g of vinyl acetate and 76.0 g of glycidyl methacrylate was metered into the reaction mixture at a rate of 0.6 g/min. Over the course of the entire reaction, the pressure was kept at about 380 bar by injecting ethylene.

After a reaction time of 10 h, the solution was decompressed and then the solvent was removed.

The glycidyl methacrylate-ethylene-vinyl acetate copolymer thus prepared has the following composition:

38.0% by weight of ethylene 55.3% by weight of vinyl acetate 6.7% by weight of glycidyl methacrylate The Mooney viscosity (ML1+4/100° C.) is 16.4 Mu. The glass transition temperature is −21° C.

II Production of Vulcanizates of the Glycidyl Methacrylate-Ethylene-Vinyl Acetate Copolymer from I with a Carboxylated Nitrile Rubber The glycidyl methacrylate-ethylene-vinyl acetate copolymer (a) and a carboxylated nitrile rubber (b) were used to produce blends as described below, which were vulcanized. The constituents of the vulcanizable mixtures are based on 100 parts rubber.

The mixtures were produced on a roller system. For this purpose, both of them the rubber (a) and (b) were mixed with carbon black on the roller system for 15 minutes. In the course of this, the temperature did not exceed 120° C. The carboxylated nitrile rubber used was a commercial standard Krynac® X 750 Grade from LANXESS Emulsion Rubber, La Wantzenau, France.

TABLE 1

| Composition of the vulcanizable mixture for vulcanizates | |
|---|---|
| Vulcanizable mixture | V1 |
| Glycidyl methacrylate-ethylene-vinyl acetate copolymer (a) | 50 phr |
| Krynac X 750 (carboxylated nitrile rubber (b)) | 50 phr |
| CORAX ® N 550/30 (carbon black) | 50 phr |
| Total phr | 150 |
| Density g/ccm | 1.212 |

The vulcanizate obtained had the properties reported in Tables 2 to 4:

TABLE 2

| Vulcanizate V1; vulcanization profile in the MDR (190° C./30 minutes) | |
|---|---|
| Vulcanizate | V1 |
| S max (dNm) | 22.24 |
| $t_{10}$ (min) | 1.5 |
| $t_{95}$ (min) | 24.5 |

TABLE 3

| Vulcanizates V1, properties | | |
|---|---|---|
| Vulcanizate | | V1 |
| Crosslinking temperature | ° C. | 190 |
| TS | MPa | 18.5 |
| EB | % | 320 |
| M50 | MPa | 2.5 |
| M100 | MPa | 6.0 |
| M300 | MPa | 17.9 |
| Hardness | Shore A | 69 |

TABLE 4

| Vulcanizate V1, compression set at 150° C. | | |
|---|---|---|
| Vulcanizate | CS 22 h | CS 70 h |
| Temperature: 100° C. | 14% | 21% |
| Temperature: 150° C. | 36% | 51% |

What is claimed is:

1. A vulcanizable rubber composition comprising:
(a) at least one ethylene-vinyl acetate copolymer containing epoxy groups, which comprises: at least 50% by weight of copolymerized vinyl acetate monomer, less than 20% by weight of copolymerized monomer which contains epoxy groups, and a balance by weight of copolymerized ethylene monomer, based on the weight of the ethylene-vinyl acetate copolymer containing epoxy groups; and
(b) at least one carboxylated nitrile rubber comprising repeat units derived from at least one conjugated diene, at least one α,β-unsaturated nitrile, and one or more further copolymerizable monomers containing carboxyl groups,
wherein a ratio by weight of (a) to (b) is 1:3 to 3:1.

2. The vulcanizable composition according to claim 1, wherein:
the composition contains no further cross-linking agents for vulcanization; and the monomer which contains epoxy groups is selected from the group consisting of 2-ethylglycidyl acrylate, 2-ethylglycidyl methacrylate, 2-(n-propyl)glycidyl acrylate, 2-(n-propyl)glycidyl methacrylate, 2-(n-butyl)glycidyl acrylate, 2-(n-butyl)glycidyl methacrylate, glycidylmethyl acrylate, glycidyl methacrylate, glycidylmethyl methacrylate, glycidyl acrylate, (3',4'-epoxyheptyl)-2-ethyl acrylate, (3',4'-epoxyheptyl)-2-ethyl methacrylate, 6',7'-epoxyheptyl acrylate, 6',7'-epoxyheptyl methacrylate, allyl glycidyl ether, allyl 3,4-epoxyheptyl ether, 6,7-epoxyheptyl allyl ether, vinyl glycidyl ether, vinyl 3,4-epoxyheptylether, 3,4-epoxyheptyl vinyl ether, 6,7-epoxyheptyl vinyl ether, o-vinylbenzyl glycidyl ether, m-vinylbenzyl glycidyl ether, p-vinylbenzyl glycidyl ether, and 3-vinylcyclohexene oxide.

3. The vulcanizable composition according to claim 1, wherein:
the at least one ethylene-vinyl acetate copolymer containing epoxy groups (a) comprises: at least 50% by weight of copolymerized vinyl acetate monomer, less than 15 wt % of copolymerized monomer which contains epoxy groups, and a balance by weight of copolymerized ethylene monomer, based on the weight of the ethylene-vinyl acetate copolymer containing epoxy groups; and
the at least one carboxylated nitrile rubber (b) comprises 1-20 parts by weight of the monomers containing carboxyl groups based on 100 parts by weight of the nitrile rubber which derives from acrylonitrile and the conjugated diene monomers.

4. The vulcanizable composition according to claim 3, wherein the monomers which contain carboxyl groups are of general formula (II)

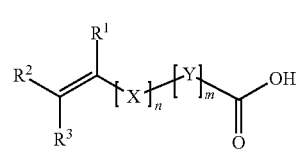

(II)

in which:
$R^1$, $R^2$, $R^3$ are the same or different and are each H, a linear or branched, saturated or mono- or polyunsaturated alkyl radical, a saturated or mono- or polyunsaturated carbo- or heterocycle radical, aryl, heteroaryl, arylalkyl, heteroarylalkyl, alkoxy, aryloxy, heteroaryloxy, amino, amido, carbamoyl, alkylthio, arylthio, sulphanyl, thiocarboxyl, sulphinyl, sulphono, sulphino, sulpheno, sulphonic acids, sulphamoyl, hydroxyimino, alkoxycarbonyl, F, Cl, Br, I, hydroxyl, phosphonato, phosphinato, silyl, silyloxy, nitrile, borates, selenates, carbonyl, oxycarbonyl, oxysulphonyl, oxo, thioxo, epoxy, cyanates, thiocyanates, isocyanates, thioisocyanates, isocyanides or carboxyl groups,
n is 0 or 1,
X is O, $O(CR_2)_p$, $(CR_2)_pO$, $C(=O)O$, $C(=O)O(CR_2)_p$, $C(=O)NR$, $(CR_2)_p$, $N(R)$, $N(R)(CR_2)_p$, $P(R)$, $P(R)(CR_2)_p$, $P(=O)(R)$, $P(=O)(R)(CR_2)_p$, S, $S(CR_2)_p$, $S(=O)$, $S(=O)(CR_2)_p$, $S(=O)_2(CR_2)_p$ or $S(=O)_2$,
where R in these radicals has the meaning defined for $R^1$-$R^3$ and p has values between 1 and 1000, m is 0 or 1, and Y are the same or different and are each a linear or branched, saturated or mono- or polyunsaturated alkyl radical, a saturated or mono- or polyunsaturated carbo- or heterocyclyl radical, aryl, heteroaryl, arylalkyl, heteroarylalkyl or alkoxyaryl radical.

5. The vulcanizable composition according to claim 4, wherein the at least one carboxylated nitrile rubber (b) comprises 2 to 10 parts by weight of the monomers containing carboxyl groups based on 100 parts by weight of the nitrile rubber which derives from acrylonitrile and the conjugated diene monomers.

6. The vulcanizable composition according to claim 5, wherein the at least one carboxylated nitrile rubber (b) is fully or partly hydrogenated.

7. The vulcanizable composition according to claim 5 or 6, wherein the ratio by weight of (a) to (b) is from 1:2 to 2:1.

8. The vulcanizable composition according to claim 1, wherein the at least one ethylene-vinyl acetate copolymer containing epoxy groups (a) comprises: at least 50% by weight of copolymerized vinyl acetate monomer, less than 15 wt % of copolymerized monomer which contains epoxy groups, and a balance by weight of copolymerized ethylene monomer, based on the weight of the ethylene-vinyl acetate copolymer containing epoxy groups.

9. The vulcanizable composition according to claim 1, wherein:

the at least one ethylene-vinyl acetate copolymer containing epoxy groups (a) comprises: at least 50% by weight of copolymerized vinyl acetate monomer, less than 10% by weight of copolymerized monomer which contains epoxy groups, and a balance by weight of copolymerized ethylene monomer, based on the weight of the ethylene-vinyl acetate copolymer containing epoxy groups; and the at least one carboxylated nitrile rubber (b) comprises 2-10 parts by weight of the monomers containing carboxyl groups based on 100 parts by weight of the nitrile rubber which derives from acrylonitrile and the conjugated diene monomers.

10. The vulcanizable composition according to claim 9, wherein:

the ratio by weight of (a) to (b) is 1:1; and the at least one carboxylated nitrile rubber (b) is fully or partly hydrogenated.

11. The vulcanizable composition according to claim 9, wherein the ratio by weight of (a) to (b) is 1:1.

12. The vulcanizable rubber composition according to claim 1, wherein the at least one ethylene-vinyl acetate copolymer containing epoxy groups (a) comprises: 55.3% by weight of copolymerized vinyl acetate monomer, 6.7% by weight of copolymerized monomer which contains epoxy groups, and 38.0% by weight of copolymerized ethylene monomer, based on the weight of the ethylene-vinyl acetate copolymer containing epoxy groups.

13. The vulcanizable composition according to claim 1, wherein the composition consists of the at least one ethylene-vinyl acetate copolymer (a) and the at least one carboxylated nitrile rubber (b).

14. A process for producing the vulcanizable composition according to claim 1, the process comprising mixing the at least one ethylene-vinyl acetate copolymer containing epoxy groups (a) with the at least one carboxylated nitrile rubber (b).

15. A process for producing vulcanizates based on ethylene-vinyl acetate copolymers containing epoxy groups, the process comprising cross-linking the vulcanizable composition according to claim 1 with increasing temperature of 20 to 250° C.

16. The process according to claim 15, wherein the temperature range is 100 to 210° C.

17. Vulcanizates obtained by the process according to claim 15.

* * * * *